United States Patent
Wall et al.

(10) Patent No.: US 11,420,680 B2
(45) Date of Patent: Aug. 23, 2022

(54) METHOD FOR ASSISTING A USER OF A MOTOR VEHICLE WHEN SWERVING AROUND AN OBSTACLE, DRIVER ASSISTANCE DEVICE, AND A MOTOR VEHICLE

(71) Applicant: Audi AG, Ingolstadt (DE)

(72) Inventors: Christian Wall, Hitzhofen (DE); Vincent Kratzer, Munich (DE)

(73) Assignee: Audi AG, Ingolstadt (DE)

( * ) Notice: Subject to any disclaimer, the term of this patent is extended or adjusted under 35 U.S.C. 154(b) by 298 days.

(21) Appl. No.: 16/622,614

(22) PCT Filed: Jun. 20, 2018

(86) PCT No.: PCT/EP2018/066351
§ 371 (c)(1),
(2) Date: Dec. 13, 2019

(87) PCT Pub. No.: WO2018/234352
PCT Pub. Date: Dec. 27, 2018

(65) Prior Publication Data
US 2020/0346692 A1    Nov. 5, 2020

(30) Foreign Application Priority Data

Jun. 20, 2017 (DE) ............... 10 2017 210 219.5

(51) Int. Cl.
*B60W 60/00* (2020.01)
*B62D 15/02* (2006.01)
(Continued)

(52) U.S. Cl.
CPC .......... *B62D 15/0295* (2013.01); *B60K 35/00* (2013.01); *B60Q 1/085* (2013.01);
(Continued)

(58) Field of Classification Search
CPC ............... B62D 15/0295; B60K 35/00; B60K 2370/1529; B60K 2370/178;
(Continued)

(56) References Cited

U.S. PATENT DOCUMENTS 8,970,451 B2 * 3/2015 Nagasawa .............. G02B 27/01
345/7
9,360,668 B2 * 6/2016 Rodriguez Moreno .....................
G06F 9/451
(Continued)

FOREIGN PATENT DOCUMENTS

CN    102910130 A    2/2013
CN    102956116 A    3/2013
(Continued)

OTHER PUBLICATIONS

International Search Report and Written Opinion of the International Searching Authority directed to related International Patent Application No. PCT/EP2018/066351, dated Sep. 25, 2018, with attached certified English-language translation; 18 pages.
(Continued)

*Primary Examiner* — Vivek D Koppikar
*Assistant Examiner* — Kathleen B Ward
(74) *Attorney, Agent, or Firm* — Sterne, Kessler, Goldstein & Fox P.L.L.C.

(57) ABSTRACT

This disclosure relates to a method for assisting a user of a motor vehicle when swerving around an obstacle on a movement path of the motor vehicle. A driver assistance device carries out the following: providing a warning signal which describes an object on the movement path and a collision area which is visible through a window, preferably a vehicle window of the motor vehicle in which the object is located; defining a swerving area visible through the vehicle window, in which a swerving point for travelling
(Continued)

around the object is visible, generating an accentuation signal, which describes a measure for accentuating the swerving area, and transmitting the accentuation signal to an accentuation device. Depending on the accentuation signal, the measure for accentuating the swerving area is carried out. The accentuation device can control a heads-up display, a monitor integrated into the vehicle window and/or a headlight.

10 Claims, 5 Drawing Sheets

(51) Int. Cl.
  *B60K 35/00* (2006.01)
  *B60Q 1/08* (2006.01)
  *B60Q 1/14* (2006.01)
  *B60Q 9/00* (2006.01)
  *B60W 30/095* (2012.01)
  *B60W 50/14* (2020.01)

(52) U.S. Cl.
  CPC ............ *B60Q 1/143* (2013.01); *B60Q 9/008* (2013.01); *B60W 30/0956* (2013.01); *B60W 50/14* (2013.01); *B60K 2370/1529* (2019.05); *B60K 2370/178* (2019.05); *B60K 2370/179* (2019.05); *B60K 2370/194* (2019.05); *B60K 2370/785* (2019.05); *B60Q 2300/23* (2013.01); *B60Q 2300/45* (2013.01); *B60W 2050/146* (2013.01)

(58) Field of Classification Search
  CPC ........ B60K 2370/179; B60K 2370/194; B60K 2370/785; B60Q 1/085; B60Q 1/143; B60Q 9/008; B60Q 2300/23; B60Q 2300/45; B60W 30/0956; B60W 50/14; B60W 2050/146
  See application file for complete search history.

(56) References Cited

U.S. PATENT DOCUMENTS

| | | | |
|---|---|---|---|
| 9,493,109 B2 * | 11/2016 | Nordbruch | B60Q 1/12 |
| 2016/0054452 A1 * | 2/2016 | Cosatto | G01S 19/48 |
| | | | 701/412 |
| 2018/0031831 A1 * | 2/2018 | Iwase | G02B 27/01 |
| 2020/0152065 A1 * | 5/2020 | Hada | G01C 21/365 |

FOREIGN PATENT DOCUMENTS

| | | | | |
|---|---|---|---|---|
| CN | 103707811 A | 4/2014 | | |
| DE | 102011081394 B3 | 10/2012 | | |
| DE | 102011081396 A1 | 2/2013 | | |
| DE | 102012214829 A1 | 2/2014 | | |
| DE | 102013110332 A1 | 6/2014 | | |
| DE | 102012025468 A1 * | 7/2014 | ............ | B60W 50/14 |
| DE | 102014213019 A1 | 1/2016 | | |
| JP | 2006171950 A | 6/2006 | | |
| WO | WO 2017/018192 A1 | 2/2017 | | |
| WO | WO-2017018192 A1 * | 2/2017 | ............ | G02B 27/01 |

OTHER PUBLICATIONS

International Preliminary Report on Patentability directed to related International Patent Application No. PCT/EP2018/066351, dated Dec. 24, 2019, with attached English-language translation; 14 pages.

* cited by examiner

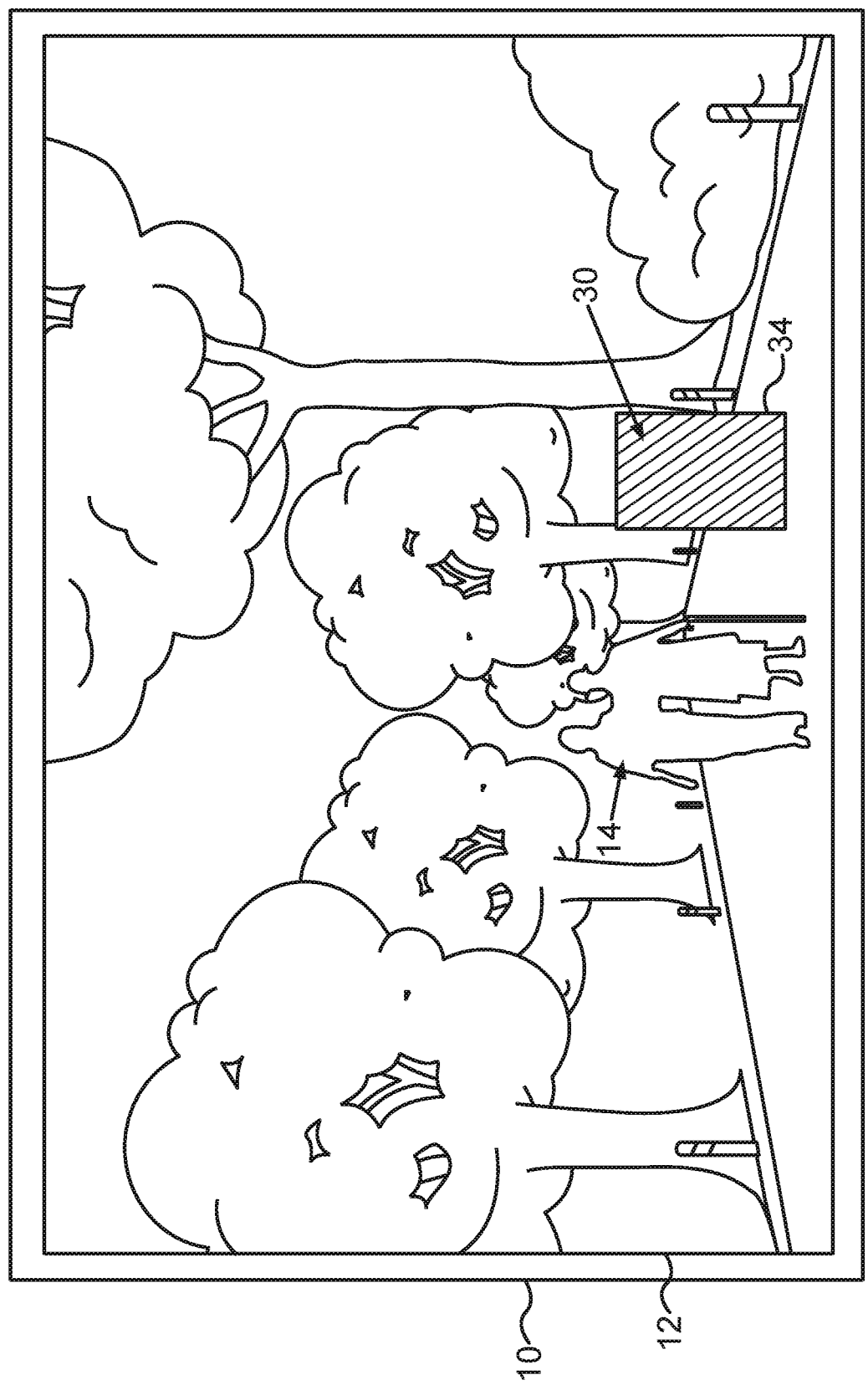

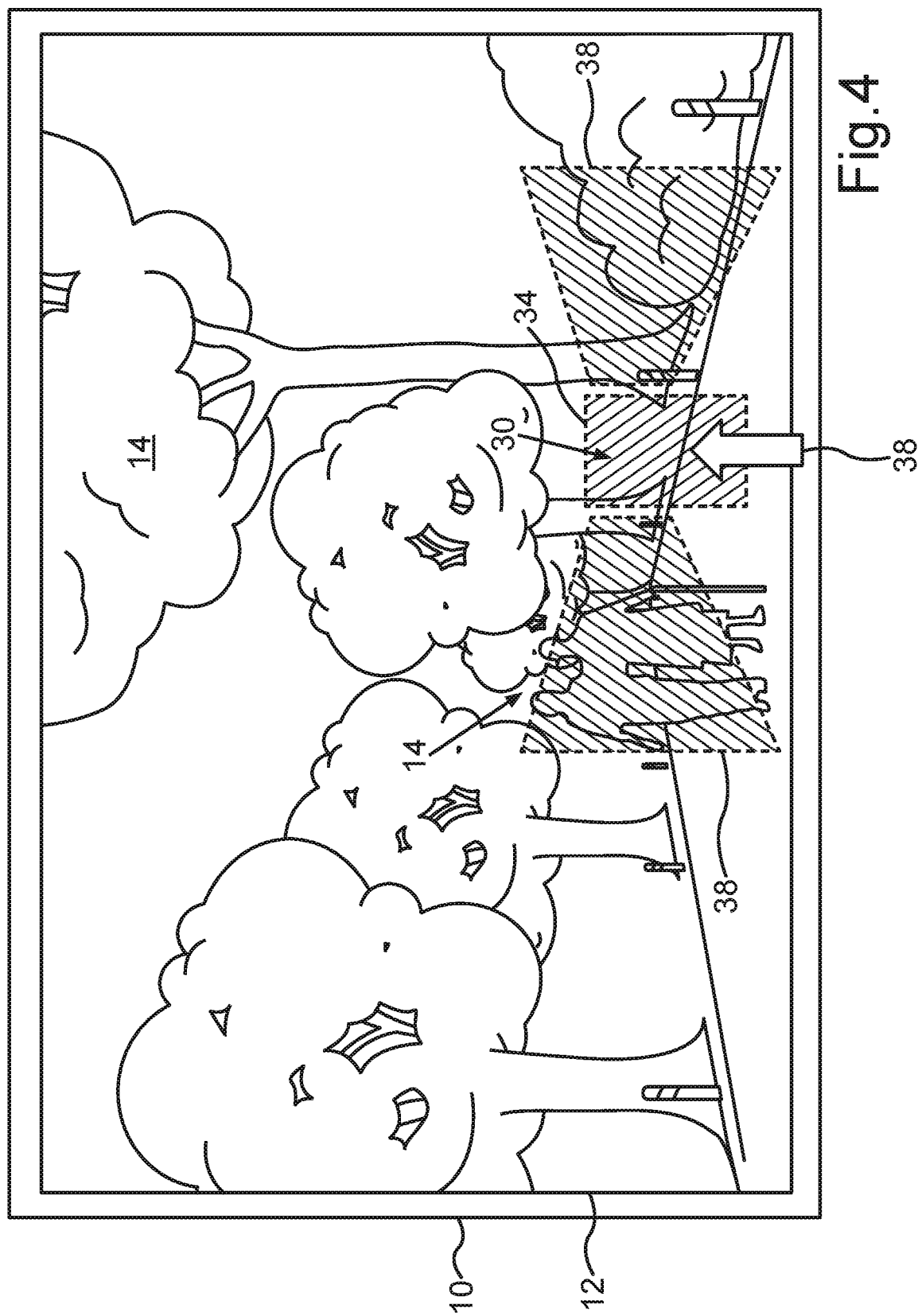

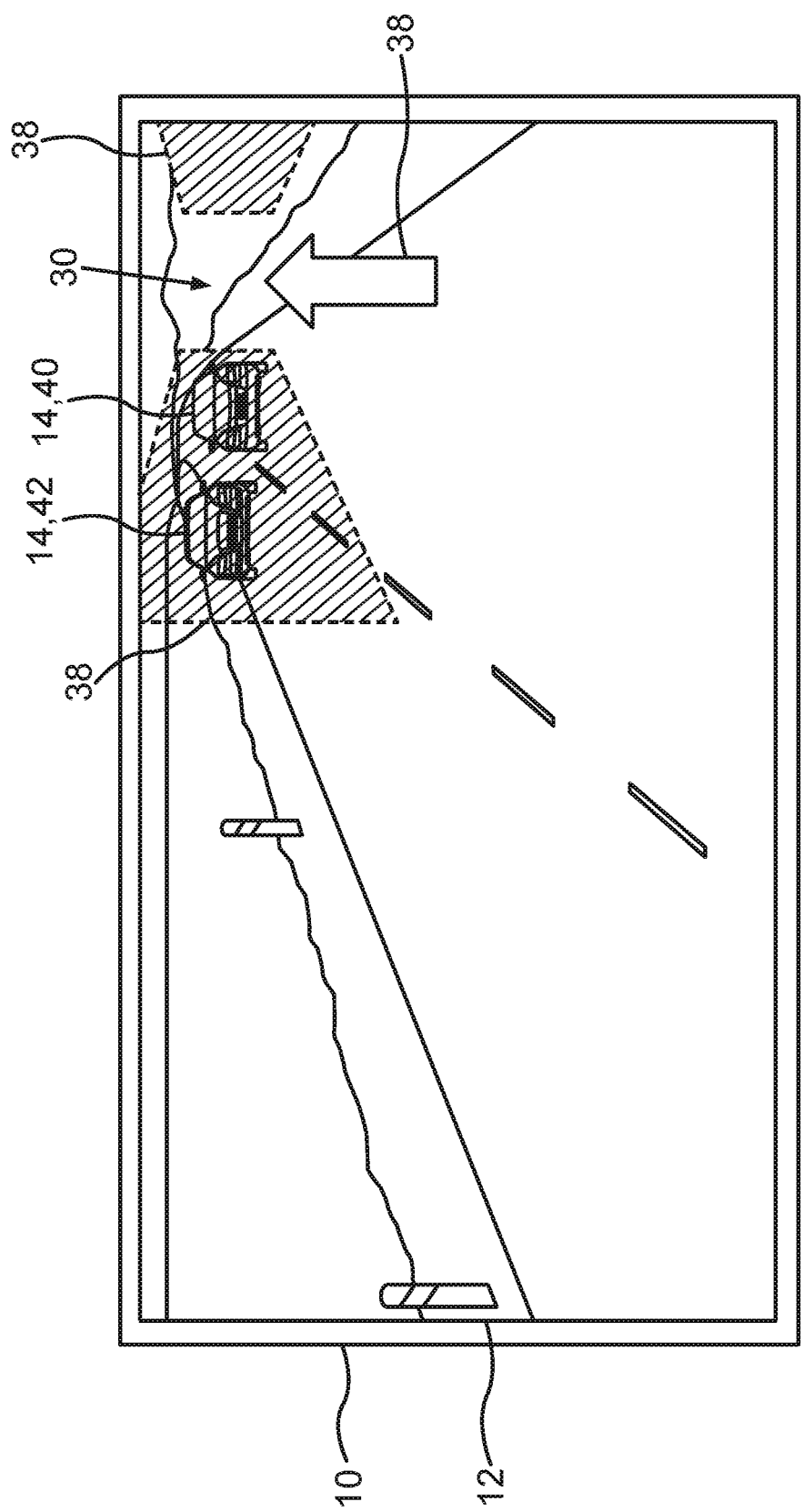

METHOD FOR ASSISTING A USER OF A MOTOR VEHICLE WHEN SWERVING AROUND AN OBSTACLE, DRIVER ASSISTANCE DEVICE, AND A MOTOR VEHICLE

TECHNICAL FIELD

The present disclosure relates to a method for assisting a user of a motor vehicle when swerving around an obstacle on a movement path of the motor vehicle. The method can be carried out by a driver assistance device, wherein a driver assistance device is understood as meaning a device or a device component for providing and performing at least one driver assistance function.

BACKGROUND

When an obstacle such as a person or an object is on a roadway, motor vehicle drivers often tend to steer exactly where they are looking. In a dangerous situation, this often leads to a driver colliding exactly with the obstacle that they actually want to avoid, that is, that they actually want to swerve around. Since only very experienced drivers can look where they want to go at the moment of the moment of shock, a large number of avoidable accidents occur due to the fact that the said psychological effect limits a driver's ability to act.

DE 10 2011 081 394 B3 relates to a method for displaying an expected movement path of a vehicle based on a current traffic situation.

From DE 10 2012 214 829 A1, a method is known for displaying a swerving trajectory for collision avoidance for a vehicle.

DE 10 2014 213 019 A1 describes a method for determining a trajectory for a driving maneuver to be performed by the vehicle.

In the presentation of such a calculated trajectory on a display or on the road, the driver is instructed how he/she has to drive around the obstacle. The driver follows this trajectory to reach the other side of the obstacle. For this he/she must, however, look at the screen.

Although the driver is quickly informed about a necessary driving movement and its course by the method of the prior art, the above-mentioned psychological effect can nevertheless occur. If the driver first looks at the obstacle despite a calculated avoidance trajectory, he/she may lose valuable time and thus have less time to concentrate on the projected trajectory.

BRIEF DESCRIPTION OF DRAWINGS/FIGURES

FIG. 3 illustrates a schematic representation of a method, in accordance with some embodiments.

FIG. 4 illustrates a schematic representation of a method, in accordance with some embodiments.

FIG. 5 illustrates a schematic representation of a method, in accordance with some embodiments.

DETAILED DESCRIPTION

Figure 1:
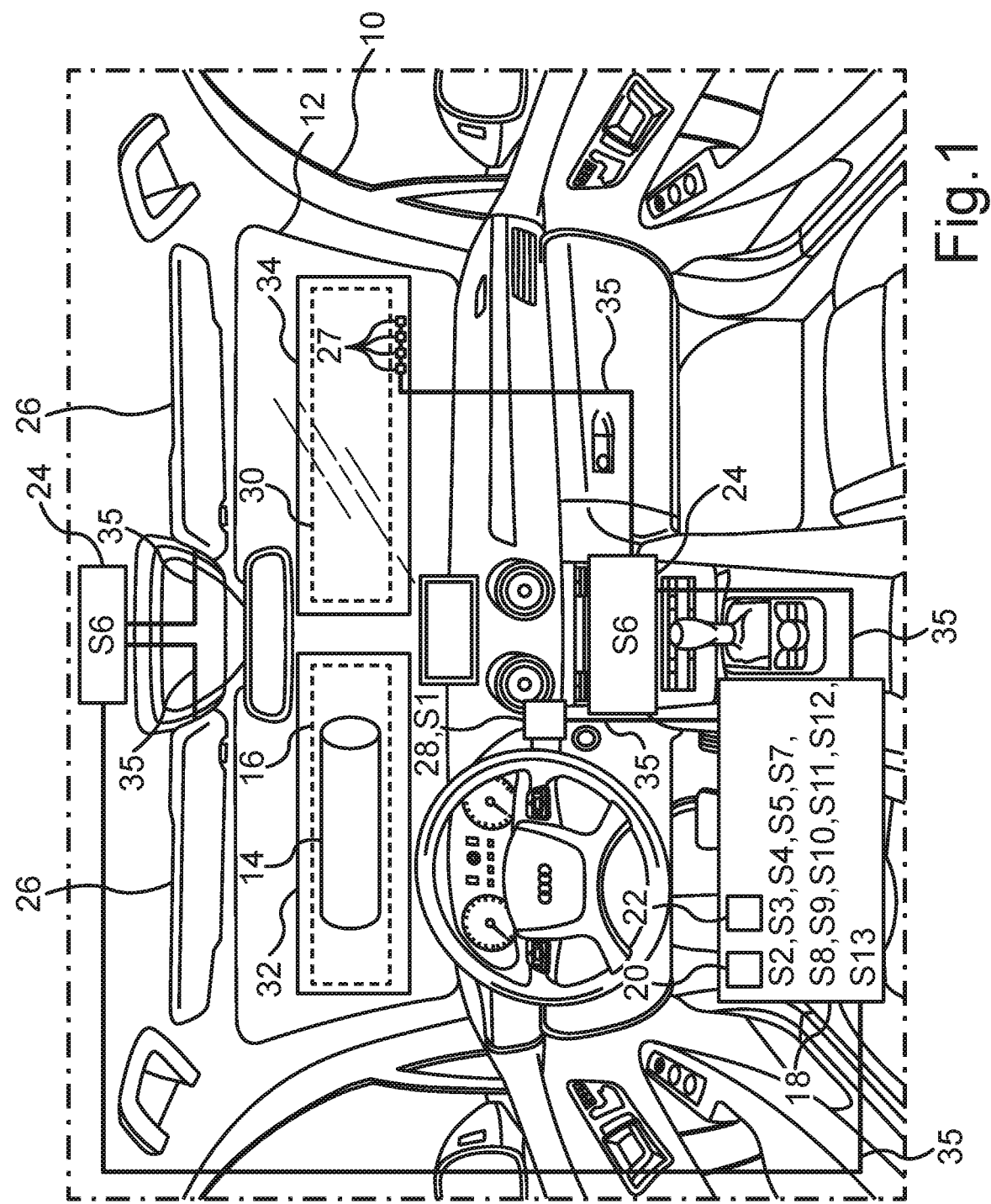
FIG. 1 illustrates a schematic representation of a method, in accordance with some embodiments.

One object of the present disclosure is to reduce a probability of collision with an obstacle and thus increase driving safety.

The stated object is achieved by the method and the devices according to the embodiments described herein and corresponding to the independent claims. Advantageous developments are provided by the dependent claims.

The present disclosure is based on providing a driving psychology supportive avoidance recommendation by visually distracting from the area in which the obstacle is located from the driver's point of view and visually highlighting a swerving area in which the motor vehicle does not approach the obstacle. By way of non-limiting example, the obstacle, i.e., a critical object on the movement path, for example, can be hidden or covered, so that the free area, i.e., the swerving area, is visually highlighted and thus a kind of virtual gate is formed. The driver is thus less or not at all distracted by the obstacle and can focus faster and better on a swerving maneuver and decide at the same time, with which swerving maneuver he/she wants to swerve around the obstacle.

In some embodiments, for assisting a user of a motor vehicle when swerving around an obstacle on a movement path of the motor vehicle, the method is characterized by the following steps carried out by a driver assistance device. The driver assistance device can include, for example, a driver assistance system.

In some embodiments, a warning signal is provided, which describes an object on the movement path and a collision area visible through a window in which collision area and the object is located. The object, i.e., the obstacle, may be, for example, a pedestrian or an object on the road. The warning signal can be provided, for example, by a sensor device of the motor vehicle, that is to say by a device or a device component which is designed and set up to detect an environment and/or a physical, chemical or other parameter of the environment of the motor vehicle and may have, for example, a camera sensor. By way of non-limiting example, the window can be a motor vehicle window, a window of a motorcycle helmet, a pair of glasses to be worn while driving, an active contact lens, and/or a device for retina projection.

In some embodiments, as a function of the warning signal being provided, there is a determination of a swerving area visible through the vehicle window, in which a swerving point for swerving around the object is visible, i.e., a swerving point, for swerving around the object. By way of non-limiting example, depending on the warning signal being provided, which describes the collision area, a target gap for swerving is determined.

In some embodiments, an accentuation signal is generated, which describes a measure for accentuating the swerving area. By way of non-limiting example, no swerving trajectory is determined which describes a specific driving maneuver and thus specifies a driving movement of the motor vehicle, but rather the point at which the object is not present, is accentuated.

In some embodiments, the accentuation signal is transmitted to an accentuation device, wherein the accentuation device is understood to mean a device or a device component for providing a measure for highlighting the swerving area. By way of non-limiting example, the accentuation device can be an accentuation device of the motor vehicle.

In some embodiments, the accentuation device can have, for example, a headlight and a device or component for controlling the headlight, and/or a display device, i.e., a device or a device component for displaying image contents, and/or a cover device, i.e., a device or a device component for covering a headlight viewing area.

In some embodiments, the method is further characterized by the following step carried out by the accentuation device:

Performing the measure to accentuate the swerving area, so performing the action described by the accentuation signal.

In some embodiments, by way of non-limiting example, the driver assistance device defines a cover area of the vehicle window, the cover area lying between a user's eye point and the collision area and thus being the area through which a visual path or line of sight of the user's eye passes, and defines an accentuation area of the vehicle window, which lies between the eye point and the swerving area. The driver assistance device determines through which area of the vehicle window the user sees the obstacle located in the collision area, and through which area of the vehicle window the user sees the swerving area, i.e., the area having a swerving point for swerving around the object. The measure for accentuating the swerving area describes an at least partial covering of the cover area of the vehicle window by the accentuation device. As a result, a glance at the corresponding area on the vehicle window can be covered mechanically. Accordingly, the measure for accentuating the swerving area may be used if the variant of the accentuation of the swerving area by means of the exemplary headlight can be less efficient in some situations, for example, during the day.

In some embodiments, the method may make use of the psychological effect already described above that a driver typically steers exactly towards where he/she is currently looking. This effect is now used to assist the driver in the driving task in critical situations. By highlighting the target gap, i.e., by highlighting the swerving area, and/or by obscuring the view of the actual obstacle, the driver's attention to the swerving area can be directed, i.e., to a determined target corridor of the vehicle for example. As a result, driving safety is ultimately increased.

In some embodiments, the measure for accentuating the swerving area can be, for example, a measure for changing a visually perceptible contrast between the swerving area and the collision area, and/or contrasting and/or highlighting the swerving area and/or covering or shadowing the collision area.

In some embodiments, for example, the measure for accentuating the swerving area may describe a control of at least one headlight of the accentuation device for illuminating the swerving area. While the swerving area is brightened, the collision area is darkened or shadowed, for example, by the turning away of the at least one headlight, which is why the driver directs his/her attention to the brightened area with a much higher probability, i.e., to the swerving area, and thus, with a substantially higher probability, the motor vehicle steers faster to the swerving area.

In some embodiments, the measure for accentuating the swerving area can describe an at least partial highlighting of the accentuation area of the vehicle window by the accentuation device. By way of non-limiting example, when the variant of the accentuation of the swerving area by means of the exemplary headlight is possibly less efficient, for example during the daytime, then the vehicle window can be used for example as a projection surface, or a view of the corresponding area on the vehicle window can be highlighted mechanically.

In some embodiments, the accentuation signal may be an image signal and the accentuation device may comprise a display device, wherein the display device comprises a device or a device component for outputting image content, for example a heads-up display or a screen integrated in the motor vehicle window. In this development, the display device can output an image described by the image signal, which can either be output a) onto the cover area for at least partially covering the collision area, wherein, for example, a dark or bright-colored field provides the view of the obstacle on the road and/or b) onto the accentuation area for at least partially highlighting the identification area relative to the coverage area, for example by outputting a light-colored frame that can at least partially frame the swerving area, for example. These measures are particularly effective measures.

In some embodiments, the accentuation device may comprise a covering device having a cover element, wherein the cover element is a component designed to cover at least a portion of the vehicle window, and may be configured, for example, as a sun visor or curtain. In this case, the measure for accentuating the swerving area may be an at least partial covering or concealing of the cover area of the vehicle window by the cover element. For example, a cover element designed as a curtain can be pulled in front of the cover area, or, for example, a cover element equipped as a sun visor can be folded over the cover area. Accordingly, mechanical measure of this embodiment is particularly efficient.

In some embodiments, the driver assistance device can simulate a collision process of a collision of the motor vehicle with the object; depending on the simulated collision process, a collision time can be determined; and based on the determined collision time, a setting of a transmission time for transmitting the accentuation signal to the accentuation device can take place. If the object, i.e., the obstacle, for example, is still very far away from the motor vehicle, the simulation can reveal that the driver still has a lot of time remaining to estimate the situation himself/herself. Under certain circumstances, the situation may change until then in such a way that the obstacle is no longer on the path of movement, when the motor vehicle has gone a bit further. On the other hand, if the simulation shows that the object can already be very close to the motor vehicle, it makes sense that the measure for accentuating the swerving area is initiated immediately. In other words, this embodiment of the method according to the invention can control the implementation of the measure in a situational manner.

The positions of the collision area and/or the swerving area from the perspective of the driver may possibly change depending on the situation, for example, if the driver changes his/her viewing angle, moves his/her head, or if the motor vehicle or the driver changes his/her relative eye position to the obstacle by a driving movement of the motor vehicle in a transverse direction, or in a longitudinal direction, or by a vehicle position change in the vertical direction. In some embodiments, in order to respond to such fluctuations of a relative position of the user to the obstacle, according to a further embodiment of the method of the invention, the driver assistance device can perform a determination of a relative displacement of the collision area and/or the swerving area with respect to an eye point of the user, preferably by determining a driving movement of the motor vehicle and/or a change in a user's viewing angle and/or a position of the object relative to the motor vehicle or to an eye point of the user of the motor vehicle. Depending on the determined relative displacement, it is possible to generate a modified accentuation signal which can describe an adaptation of the measure to the determined relative displacement of the collision area and/or the swerving area, and the changed accentuation signal can be transmitted by the driver assistance device to the accentuation device. If the accentuation device comprises, for example, a heads-up display, the output image, which can be output, for example, to the cover area, can also be displaced, for example during a driving movement of the motor vehicle, depending on the exemplary travel movement, so that only the collision area can be shaded or darkened by the image. This also increases driving safety.

In some embodiments, a driver assistance device is disclosed. The driver assistance device may have a processor device, wherein the processor device is understood to be a device or a component for electronic data processing. The processor device may preferably have at least one microcontroller and/or at least one microprocessor. The processor device may be configured to execute a program code which may be stored, for example, in a data memory of the driver assistance device or of the motor vehicle. By executing such a program code, the method as described herein can be carried out. The driver assistance device is set up to carry out the method steps of a method as described above relating to the driver assistance device. By way of non-limiting example, the driver assistance device may be a driver assistance device of the motor vehicle, a driver assistance device of a motorcycle helmet, a pair of glasses to be worn while driving, an active contact lens, or device for retina projection.

In some embodiments, a motor vehicle is disclosed. By way of non-limiting example, the motor vehicle may be a car such as a passenger car. The motor vehicle may have an accentuation device and is characterized by an embodiment of the driver assistance device as described herein.

In some embodiments, the accentuation device may comprise a) a cover device having a cover element and/or b) a headlight and/or c) a display device, wherein the display device can be configured as a heads-up display and/or at least one lighting element integrated in the motor vehicle window and/or a display element and/or a screen, such as an OLED screen, arranged in or on a pane of a vehicle window and/or in or on a vehicle window, and/or a screen arranged in a visual path of the driver to the obstacle, and/or may have a display element and/or may be an integrated or vapor-deposited display device in the window pane. An exemplary screen may, for example, also have one or more hologram films which may be suitable for coupling light in the direction of the driver's eye, and/or a window of a motorcycle helmet, and/or a combiner window of a heads-up display, which may realize light extraction between the vehicle window and driver, and/or, for example, a display, for example, an LCD display, arranged in the visual beam or visual path to the object, said display allowing for obscuring the view of certain areas.

In some embodiments, the accentuation device may comprise a device which allows a masking or blending of the viewing beam to the obstacle, for example, a pair of glasses to be worn while driving or an active contact lens or a device for retina projection.

The embodiments described above are discussed with reference to the drawings. In the embodiments, the components of the embodiments that are described each constitute individual features to be considered both individually and in a combination that is different from the combination described. In addition, the embodiments described may also be supplemented by further features, which have already been described.

In the drawings, functionally identical elements are denoted with the same reference signs.

FIG. 1 exemplarily illustrates the principle of the method, in accordance with some embodiments. FIG. 1 shows a motor vehicle 10, which may be designed, for example, as a passenger car. FIG. 1 shows an exemplary vehicle window 12 of the motor vehicle 10, which is a windshield in the example of FIG. 1. The exemplary vehicle window 12 shows an object 14, for example a tree trunk, which lies on a movement path of the motor vehicle 10 in the example of FIG. 1, such that the motor vehicle 10 could possibly collide with the object 14. The area in which the object 14 is located is referred to as the collision area 16.

The motor vehicle 10 has a driver assistance device 18, which can be designed and set up, for example, as a driver assistance system and, for example, can be part of an on-board computer of the motor vehicle 10 or can be connected to the on-board computer. The driver assistance device 18 may optionally have a processor device 20 and/or a memory device 22. The processor device 20 may have, for example, at least one microcontroller and/or at least one microprocessor, or be configured as a microprocessor and/or microcontroller and be configured to execute a program code, which may be stored, for example, in the memory device 22 in order to carry out the method of the invention. The memory device 22 can be designed as any data storage known to the person skilled in the art from the prior art, for example, as a hard disk and/or memory card.

FIG. 1 shows an accentuation device 24 which, in the example of FIG. 1, can be designed as a display device or may comprise such. By way of non-limiting example, such an accentuation device 24 can be designed as a heads-up display, or, as indicated in FIG. 1, by light-emitting elements 27 shown by way of example, may be a screen integrated into the motor vehicle window 12. The respective light-emitting elements 27 may, for example, be designed as organic light-emitting diodes ("OLEDs") or light-emitting diodes ("LEDs") and arranged, for example, over an entire surface of the vehicle window 12, or only over a partial area. For example, the exemplary screen integrated into the vehicle window 12 can be configured as an OLED display, for example as part of the windshield, or the entire windshield can be configured as an OLED display or other screen type, for example as an LCD display, which can be integrated or applied entirely or partly in or the windscreen. For the sake of clarity, however, only a number of four light-emitting elements 27 are shown in FIG. 1 by way of example. The control of the light-emitting elements 27 can take place according to technologies known from the prior art, i.e. the exemplary accentuation device 24 can have such a screen integrated into the motor vehicle window 12.

In accordance with some embodiments, the accentuation device 24 may have at least one cover element 26, wherein the accentuation device 24 is indicated in FIG. 1 by way of example above the two cover elements 26. The cover elements 26 may be, for example, two sun visors, which can be folded down, for example, by the accentuation device 24. For this purpose, the accentuation device 24 can have, for example, an electric motor and a crank, or a cable pull with which the exemplary cover elements 26 can preferably be moved independently of one another. In an alternative example (not shown in the figure), the cover element 26 or the cover elements 26 can be designed as a curtain which, for example, can be pulled independently of the pane or of the vehicle window 12 by the accentuation device 24. Alternatively or additionally, an accentuation device 24 configured as a cover device may have, for example, a plate as a cover element 26, which can be folded, for example, over the collision area 16 or pushed up from a scoop of the motor vehicle 10.

FIG. 1 further shows an optional detection device 28, which may comprise, for example, a camera and/or a viewing angle sensor. In this case, a device or a device component for detecting an object 14 or a plurality of objects 14 is understood as detection device, and for this purpose can have at least one appropriately configured sensor. The detection device 28 may be a component of the driver assistance device 18, wherein the driver assistance device 18 and the detection device 28 provide, for example, an emergency brake assistant and/or a collision warning system. Such systems may, for example, comprise at least one sensor for detecting a distance to an object 14 and/or for detecting an acceleration and/or a steering angle and/or other corresponding parameters. The detection device 28 may comprise, for example, a camera or a plurality of cameras, which may be arranged, for example, in a bumper or next to a headlight of the motor vehicle 10, or, for example, behind the windscreen in the area of an interior mirror. By way of non-limiting example, the detection device 28 may comprise one or more radar sensors, which may be arranged, for example, in the bumper or in a radiator grille. In the example of FIG. 1, the detection device 28 may, for example, have an angle sensor arranged in an interior of the motor vehicle 10 for detecting and determining an eye position and/or a viewing angle and/or a head movement and/or a head position of a user of the motor vehicle 10. These embodiments for detecting and determining the viewing angle are optional features.

In accordance with some embodiments, in method step S1, the exemplary collision warning system can detect, for example, the object 14 on the movement path of the motor vehicle 10. A corresponding sensor signal that can describe the object 14 and/or a spatial position or orientation of the object 14 can be generated by the exemplary collision warning system. The warning signal may be transmitted to the driver assistance device 18 and thereby the warning signal of the driver assistance device 18 may be provided (S2). Depending on the warning signal provided and/or on environmental information from, for example, a camera image and/or video signal and/or environmental data acquired by a radar sensor, the collision area 16 and thus a swerving area 30 can be defined, wherein the swerving area 30 in the example of FIG. 1 can be in a driver's field of vision to the right of the object 14.

The definition of the swerving area 30 (S3) can be effected, for example, by means of a collision course calculation known to the person skilled in the art, which can be carried out, for example, by means of a brake assistance function and/or the already mentioned collision warning function of the driver assistance device 18. In this case, in addition to the object 14, for example, other objects located in the vicinity of the motor vehicle 10 can also be detected and taken into account, for example trees (not shown in the figure) that can be located to the right of the roadway. The collision course calculation can be carried out, for example, by sensor data fusion of a plurality of sensors of the detection device 28 and/or taking into account movement trajectories of other road users.

In method step S4, the driver assistance device 18 generates an accentuation signal which can fold down the exemplary cover element 26 shown on the left in FIG. 1 and thus cover the view of the user of the motor vehicle 10 on the object 14. The right-hand cover elements 26 can remain folded up, and the view of that portion of the vehicle window 12 through which the swerving area 30 can be seen, that is to say the accentuation area 34, is still visible. The driver thus only sees the swerving area 30 through the accentuation area 34 and, with a very high degree of probability, steers the motor vehicle 10 immediately to the swerving area 30.

In accordance with some embodiments, an automatic steering and/or braking and/or acceleration intervention can take place, for example a shaking of a steering wheel or a slight steering intervention in a desired direction towards the swerving area 30, or a higher perceptible resistance on an accelerator pedal. To achieve this, the driver assistance device 18 can generate a control signal, for example, as a function of the defined swerving area 30 and/or the collision area 16.

For controlling the accentuation device 24, the accentuation signal generated by the driver assistance device 18 (S4) may be transmitted to the accentuation device 24 via a data communication connection 35 (S5). The data communication connection 35 can preferably be a wired data communication connection 35, for example, a data bus of a bus system of the motor vehicle 10, for example, a CAN bus. By way of non-limiting example, the data communication connection 35 may be a wireless data communication connection such as a WLAN and/or Bluetooth connection, or an optical data communication connection, and/or a mechanical connection. Further, possible data communication connections 35 are also identified by the reference numeral 35 in FIG. 1 (as well as in the other figures).

In accordance with some embodiments, performing the measure for accentuating the swerving area 30 (S6) can be performed by an accentuation device 24, which, as already described above, can comprise a display device. In this case, the accentuation signal may be an image signal. Both in this example and in the above example with the accentuation device 24, which can be designed as a cover device and can have at least one cover element 26, the cover area 32 of the vehicle window 12, i.e., the area of the vehicle window 12, through which a visual path of the user passes, can initially be defined (S7) for performing (S6) the measure for accentuating the swerving area 30, for example, by determining an eye point or an eye position of an eye of the user with the aid of the exemplary viewing angle sensor. When covering the cover area 32, therefore, a visual path to the obstacle is also covered.

By way of non-limiting example, a pressure sensor in a motor vehicle seat and/or a proximity sensor, for example an ultrasonic sensor in or on the motor vehicle seat or the driver's environment, may transmit corresponding information to the driver assistance device 18, which can then determine in dependence on the sensor signal that the user of the motor vehicle 10 is located, for example, in the driver's seat. It can then be determined that the cover area 32 in the example of FIG. 1 lies on the left side of the windshield, and it can be deduced that, taking into account the position and/or orientation of the object 14, the accentuation area 34 of FIG. 1 can be located on the right side.

In accordance with some embodiments, for performing the measure for accentuating the swerving area 30 (S6), the display device may output the image signal describing, for example, a rectangle, which may, for example, be of a dark color, outputted to the cover area 32 or to a partial area of the coverage area 32 or can be provided as a virtual image at the height of the cover area 32.

In accordance with some embodiments, an image of a heads-up display is superimposed on visible light from outside through the window, so that covering of an area of the vehicle window is effected only by deterioration of a contrast and/or by crossfading, unlike, for example, an LCD display which can be widely switched to opaque. When using a heads-up display, the totality of the light comes from outside through the window, and thus also the entire image information. Bright colors are very well suited for covering in heads-up displays.

By way of non-limiting example, according to the method of FIG. 1, an accentuation device 24 having a heads-up display can output a light color. Due to a higher brightness of the image of the heads-up image, however, a proportionately darker part of the light coming from outside can no longer be perceived by the human eye.

A light-colored image may be particularly advantageous for covering the cover area 32 in the case of, for example, an accentuation device 24, which may, for example, have LEDs which can be coupled laterally into the window and coupled out via suitable structures, for example a hologram foil at certain locations of the windshield in the direction of the driver's eye, of an accentuation device 24 having light elements 27 mounted in or on the window, may for example have an OLED display mounted in or on the window.

By way of non-limiting example, in accordance with some embodiments, with lower brightness, a quasi-partial transparency can be generated, such that the light that falls from the obstacle into the driver's eye is only reduced, but not completely physiologically imperceptible. This is useful, for example, if only one accentuation is desired. By way of non-limiting example, the exemplary LCD display cannot be switched to maximum opacity but, for example, only to a partial opacity.

A similar effect to the LCD display, which may for example be integrated into the window, may optionally be variable in its manifestation of the opacity produced. This can be realized for example by means of superimposed and mutually rotatable polarizing filters. For example, it may be provided that the user wears polarization (sun) glasses or contact lenses having such a polarization filter.

If the exemplary accentuation device 24 comprises, for example, a heads-up display, a corresponding image can be projected onto the cover area 32 or a corresponding virtual image can be displayed on the cover area 32. The cover area 32 does not necessarily have to lie in the plane or a free-form surface of the windshield, but may, for example, be in or in front of the vehicle, for example, realized by a virtual image distance in a heads-up display. If such an accentuation device 24, which may have a display device, comprises the aforementioned screen integrated in the vehicle window 12, then the accentuation signal may specify a control of one or more light-emitting elements 27. The light-emitting elements 27 thus activated can, for example, brighten or darken in the cover area 32, such that the object 14 is shaded or covered. By way of non-limiting example, such a measure can have the effect of reducing the contrast by brightening and thus, for the human eye, the original image information similar to masking due to the reduced contrast. The image can be displayed on the swerving area 30, for example, by controlling and activating light-emitting elements 27 in a bright color and thus lightening and highlighting the swerving area 30 or a partial area and/or make this area visible by displaying a dark or unlighted representation in a heads-up display compared to one or more areas that are "hidden" by a bright display or areas that are less or not noticeable due to contrast reduction.

Such an image signal may optionally describe a pattern or shape, such as a flashing frame on or within the accentuation area 34, or, for example, an image of an arrow highlighting the accentuation area 34 and hence the swerving area 30.

In accordance with some embodiments, it can be provided that a sensible point in time or a time range can be taken into account for carrying out the measure (S6). For this purpose, for example, in the course of the collision course calculation, the collision process can be simulated (S8) and a corresponding collision time can be determined (S9). In the example of FIG. 1, it can thus be determined, for example, that the collision time is already very close to a current time, wherein this adjustment can be carried out, for example, by means of a chronometer, for example a clock of the driver assistance device 18. By way of example, specifications may be stored in the memory device 22 as to which urgency can be present at which remaining time periods up to the simulated collision. In this case, for example, a type of the object 14 can be taken into account. For example, if the detection device 28 or the driver assistance device 18 determines, for example by means of image recognition software and a camera image of the detection device 28, that the object 14 is a tree trunk, it is very unlikely that the tree trunk will disappear from the roadway in a timely manner; therefore, it may be urgent to immediately generate the accentuation signal (S4).

If the object 14 is, for example, persons on the road, and the motor vehicle 10 at the present time still has a very large distance from the exemplary persons, there may still be the possibility that the persons will disappear from the roadway. Depending on the urgency of performing the measure to accentuate the swerving area 30, the transmission of the accentuation signal (S5) to the accentuation device 24 may be set (S10).

In accordance with some embodiments, the exemplary detection device 28 may comprise the aforementioned angle sensor and/or a sensor for detecting, for example, a head movement of the user of the motor vehicle 10. For example, if the user moves his/her head or if the user steers, for example, the motor vehicle 10 in a transverse direction of the motor vehicle 10, the object 14 can move relatively from his/her point of view, whereby also the collision area 16 and thus the swerving area 30 can move, and thus also the cover area 32 and the accentuation area 34. The relative displacement of the collision area 16 and/or the swerving area 30 can therefore be determined (S11) and a further, modified accentuation signal can be generated (S12) in dependence thereon, which can describe the relative displacement and/or a change in the measure. The same applies to an optional shift in a vertical direction, since, for reasons of perspective, objects which approach relative to the vehicle shift in their position relative to the driver's eye, even when the vehicle is driven directly onto the object. In the optional method step S13, the changed accentuation signal can then be transmitted to the accentuation device 24. In other words, the area on the vehicle window 12, on which an image can be displayed by way of example, can be moved along with the exemplary driving movement in the transverse direction of the motor vehicle 10. The same can analogously be provided for an optional displacement in a longitudinal direction and/or a vertical direction.

Figure 2:
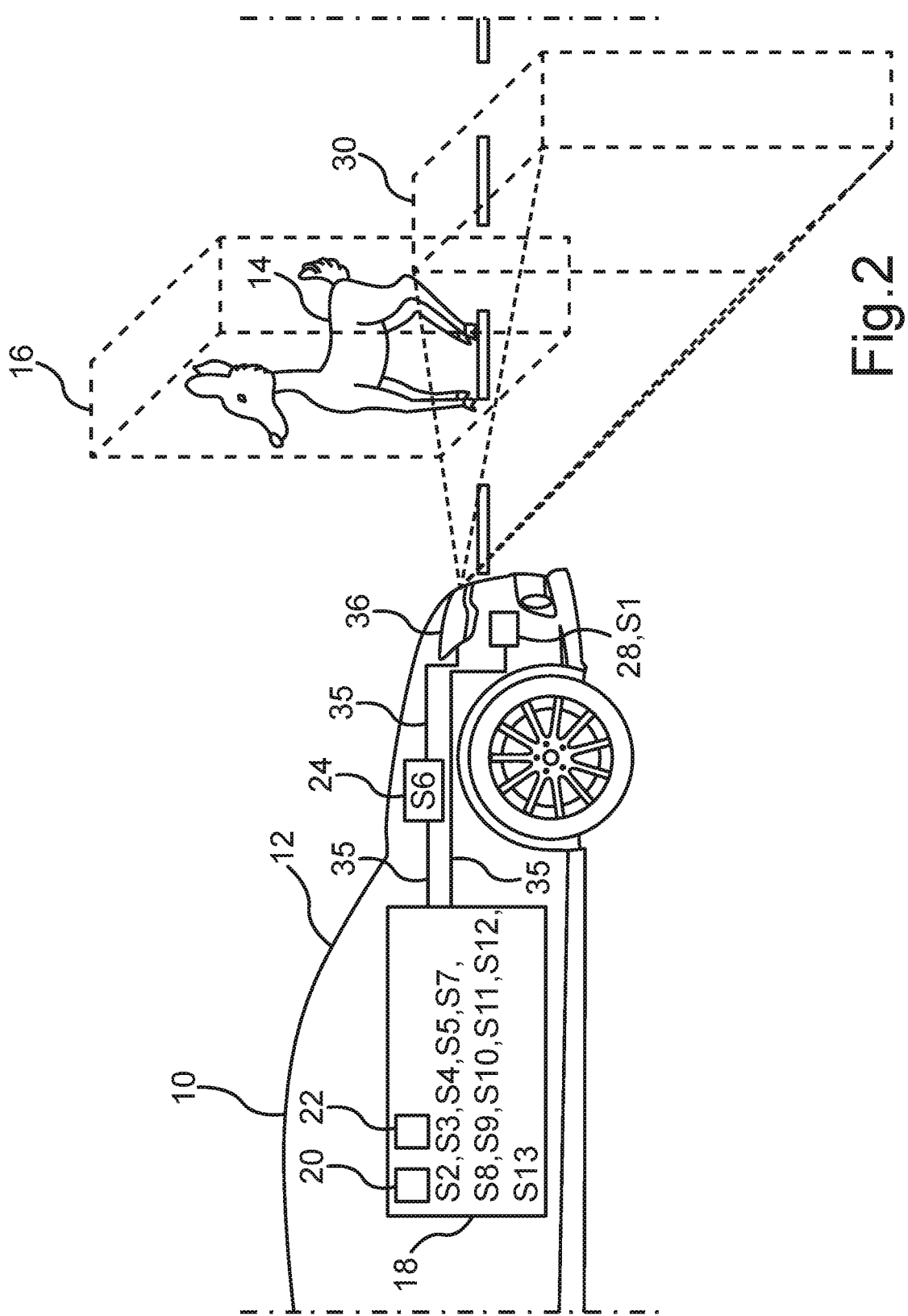
FIG. 2 illustrates a schematic representation of a method, in accordance with some embodiments.

FIG. 2 shows a further exemplary embodiment of the method, in which, by way of non-limiting example, the measure for accentuating the swerving area 30 can be controlling a headlight 36 of the accentuation device 24. In the following, only the differences from the method as described with reference to FIG. 1 will be discussed.

For controlling, and thus, for example, for moving the headlight 36, the accentuation device 24 can generate a control signal which can describe, for example, pivoting of the headlight 36 or a plurality of headlights 36 away from the collision area 16 and toward the swerving area 30. A corresponding electronic and/or mechanic system for moving a headlight 36 is known to the skilled person from the prior art. Such a headlight 36 may be configured, for example, as a matrix mirror headlight.

In the example of FIG. 2, for example, the object 14 may be a wild animal that may have jumped onto the roadway, for example. The user of the motor vehicle 10 is traveling at night, for example. In the exemplary embodiment, the headlight 36 can be controlled and thereby the headlight light can be turned away from the collision area, so that the swerving area 30 can be illuminated (and thus the area and the collision area can be darkened). In the example of FIG. 2, this has the additional advantage that the wild animal is not dazzled and is more likely to leave the collision area due to the omission of the glare. By the exemplary pivoting of the headlight 36, alternatively by changing an illumination direction or the exit direction of the light from the headlight (s), the swerving area 30 is also accentuated for the driver of the motor vehicle 10 (and thus accentuation of the collision area 32 is removed), such that he/she will very likely steer intuitively towards the swerving area 30. By way of non-limiting example, it may be provided, that the measure for accentuating the swerving area 30 may include dimming and/or switching off the exemplary headlight 36.

FIG. 3 shows a further exemplary embodiment, in which the field of vision of, for example, a driver of the motor vehicle 10 is shown. In this exemplary embodiment, the method according to the example of FIG. 1 and/or FIG. 2 can be carried out, wherein, for better clarity, the further components of the motor vehicle 10 shown in FIG. 1 and FIG. 2 are not shown but can be complemented with the example of FIG. 3. In the example of FIG. 3, the object 14 may be one or more people on the roadway. FIG. 3 shows the accentuation area 34, which can be illuminated by headlights 36, for example. By way of non-limiting example, the accentuation area 34 shown in FIG. 3 can be superimposed, for example, with an image that can emphasize the swerving area 30. It can be provided that the image signal can describe, for example, an image of a green driving lane, which can quickly and comprehensibly indicate to the exemplary driver that he/she can drive in this area without collision or with virtually no collision, and thereby highlights the swerving area 30.

In the example of FIG. 4, it may additionally or optionally be provided that an image 38 can be output on the motor vehicle window 12 on the exemplary heads-up display or the exemplary screen integrated in the motor vehicle window 12, for example representing two red quadrangles, which can, for example, be designed as perspective red "walls" that can cover, for example, the object 14, and for example, a further object 14 such as a tree at the wayside. The images 38 may thus cover the objects 14 and highlight, for example, a target corridor. In addition, in FIG. 4, another image 38 is shown, which may be, for example, an image of a green arrow, so that the driver can detect even more quickly that he/she should drive exactly to the swerving area 30 highlighted by the images 38. His/her attention is not or hardly distracted by the covered or partially covered objects 14, since they are not highlighted, but partially or completely covered or shaded or darkened. In addition, as already described for FIG. 3, the swerving area 30 can be emphasized by, for example, pivoting the headlights 36, as a result of which the danger area, that is to say the collision area 32, is reduced or completely canceled out by dimming in the perception.

If the images 38 are represented, for example, by means of augmented reality ("AR"), they can be tracked and/or adjusted, for example, depending on a height and/or a sitting position and/or an eye position of the user of the motor vehicle 10. This results in a perspective correct representation, so the driver can grasp the situation faster and react faster. In addition, such AR systems allow a superimposed representation in sufficient quality even without detection of the exact eye position of the driver of the motor vehicle.

Tracking of the display content or contents may be done here, for example, by, among other things, tracking the display content or display contents on a display.

The example of FIG. 5 shows a situation in which the motor vehicle 10 can drive towards, for example, two further motor vehicles 40, 42, wherein one of the motor vehicles 40 can travel, for example, on the same roadway of the motor vehicle 10. The image of FIG. 5 schematically highlights the swerving area 30 through images 38, the exemplary red "walls" of the example of FIG. 4. In the example of FIG. 5, for example, a meadow at the edge of the roadway can be highlighted as the swerving area 30. FIG. 5 shows how efficiently the exemplary further motor vehicles 40, 42 can be covered or shaded.

By means of the method as described herein, according to a further exemplary embodiment, for example, trees on an avenue or advertising posters on the roadside, which could distract a driver, can also be visually covered. Such a contrast advantageously predefines a solution path, that is to say a target corridor, and the driver of the motor vehicle 10 can, however, continue to independently and autonomously decide which driving maneuver he/she wishes to carry out. By way of non-limiting example, the method does not propose a driving movement by displaying a driving trajectory, but only emphasizes to the driver at which point there is no object 14, that is, at which point he/she can swerve around it. This has the advantage that the driver does not first consider why he/she should now, for example, drive a serpentine line or carry out a certain driving movement, although he/she spontaneously has another possibility for swerving around the object 14 by steering towards the swerving area 30, for example. As a result, the driver can react much faster and a collision with the object 14 can be prevented with higher probability.

Overall, the embodiments show how a driving psychology supportive swerving recommendation can be provided by the method as described herein. Here, the psychological effect described above is taken into account for the alternative recommendation.

According to a further embodiment, for this purpose a target gap can be highlighted as the swerving area 30 and/or a view of the actual obstacle, i.e. the object 14, can be covered for example, and thus the driver's attention is driven to the swerving area 30, the determined and exemplary target corridor of the motor vehicle 10.

This may be implemented, for example, with the aid of heads-up displays and/or one or more headlights 36 of the accentuation device 24, and/or by, for example, active components in the instrument panel, as well as, for example, by active displays such as OLEDs in the exemplary windshield. For example, mechanical and/or electronic implementations are conceivable. By way of non-limiting example, implementation may include the use of the heads-up display and/or the headlight or headlights 36.

Such a system ensures that the target position to be reached in dangerous situations is approached with a higher probability than without the auxiliary system according to the embodiments as described herein (or with auxiliary systems which highlight the obstacle). This results in a significant increase in driving safety.

The invention claimed is:

1. A method for assisting a user of a motor vehicle to swerve around an object on a movement path of the motor vehicle, the method comprising:
   providing, by a driver assistance system, a warning signal describing the object on the movement path and a collision area visible to the user through a window;

based on the warning signal, defining, by the driver assistance system, a swerving area, a cover area of the window, and an accentuation area of the window, wherein the swerving area is visible through the window and in which a swerving point for swerving around the object is visible, wherein the cover area is located between an eye point of the user and the collision area, and wherein the accentuation area is located between the eye point and the swerving area;

generating, by the driver assistance system, an accentuation signal comprising a measure to accentuate the swerving area;

transmitting, from the driver assistance system to an accentuation device, the accentuation signal; and based on the accentuation signal, performing, by the accentuation device, the measure to accentuate the swerving area, wherein the measure for accentuating the swerving area comprises at least partial covering of the cover area by the accentuation device, wherein the accentuation device further comprises a cover device, wherein the cover device comprises a cover element, and wherein the method further comprises:

covering, by the accentuation device, a portion of the cover area of the window by the cover element, wherein the cover element comprises a curtain, a sun visor and/or a plate.

2. The method of claim 1, wherein the window is a motor vehicle window of the motor vehicle, and wherein the accentuation device is an accentuation device of the motor vehicle.

3. The method of claim 1, further comprising generating the measure for accentuating the swerving area, wherein the measure for accentuating the swerving area further comprises controlling at least one headlight of the accentuation device for illuminating the swerving area.

4. The method of claim 1, further comprising generating the measure for accentuating the swerving area, wherein the measure for accentuating the swerving area further comprises highlighting a portion of the accentuation area of the window by the accentuation device.

5. The method of claim 1, further comprising:
based on an image signal, outputting an image on the cover area for at least partially covering the collision area, and/or on the accentuation area for at least partially highlighting the swerving area relative to the cover area,
wherein the image signal is the accentuation signal, and wherein the accentuation device comprises a display device.

6. The method of claim 1, further comprising:
simulating, by a driver assistance device, a collision process of a collision with the object;
based on the simulated collision process, determining a collision time; and
based on the determined collision time, defining a transmission time for transmitting the accentuation signal.

7. The method of claim 1, further comprising:
determining, by the driver assistance system, a driving movement of the motor vehicle and/or a change in at least one of a viewing angle of the user and a position of the object relative to the motor vehicle or to the eye point of the user of the motor vehicle;
based on the determined driving movement and/or the change, determining, by the driver assistance system, a relative displacement of the collision area and/or the swerving area with respect to the eye point of the user;

based on the determined relative displacement, generating, by the driver assistance system, a changed accentuation signal, wherein the changed accentuation signal comprises an adaptation of the measure to the relative displacement of the collision area and/or the swerving area; and transmitting, by the driver assistance system, the changed accentuation signal to the accentuation device.

8. A driver assistance device, comprising:
a processor,
wherein the driver assistance device is configured to perform operations comprising:
providing a warning signal describing an object on a movement path of a motor vehicle and a collision area visible to a user of the motor vehicle through a window;
based on the warning signal, defining a swerving area, a cover area of the window, and an accentuation area of the window, wherein the swerving area is visible through the window, in which a swerving point for swerving around the object is visible, wherein the cover area is located between an eye point of the user and the collision area, and wherein the accentuation area is located between the eye point and the swerving area;
generating an accentuation signal comprising a measure to accentuate the swerving area; and
transmitting, from the driver assistance device to an accentuation device, the accentuation signal, wherein the measure for accentuating the swerving area comprises at least partial covering of the cover area by the accentuation device, wherein the accentuation device further comprises a cover device, wherein the cover device comprises a cover element, and wherein the operations further comprise:
covering, by the accentuation device, a portion of the cover area of the window by the cover element, wherein the cover element comprises a curtain, a sun visor and/or a plate.

9. A motor vehicle, comprising:
an accentuation device; and
a driver assistance device comprising a processor, wherein the driver assistance device is configured to perform operations comprising:
providing a warning signal describing an object on a movement path of the motor vehicle and a collision area visible to a user of the motor vehicle through a window,
based on the warning signal, defining a swerving area, a cover area of the window, and an accentuation area of the window, wherein the swerving area is visible through the window, in which a swerving point for swerving around the object is visible, wherein the cover area is located between an eye point of the user and the collision area, and wherein the accentuation area is located between the eye point and the swerving area,
generating an accentuation signal comprising a measure to accentuate the swerving area, and
transmitting, from the driver assistance device to an accentuation device, the accentuation signal, and
wherein the measure for accentuating the swerving area comprises at least partial covering of the cover area by the accentuation device, wherein the accentuation device further comprises a cover device, wherein the cover device comprises a cover element, and wherein the operations further comprise:
covering, by the accentuation device, a portion of the cover area of the window by the cover element, wherein the cover element comprises a curtain, a sun visor and/or a plate.

10. The motor vehicle of claim 9, wherein the accentuation device further comprises a covering device, a headlight, and/or a display device,
wherein the display device comprises a heads-up display, at least one light-emitting element integrated in a motor vehicle window, a screen arranged in or on the motor vehicle window, a screen arranged in a sight path of the driver to the object, and
wherein the covering device comprises a cover element.

* * * * *